United States Patent [19]
Newton

[11] Patent Number: 5,687,561
[45] Date of Patent: Nov. 18, 1997

[54] DUCTED FAN GAS TURBINE ENGINE ACCESSORY DRIVE

[75] Inventor: Arnold C. Newton, Derby, England

[73] Assignee: Rolls-Royce plc, London, England

[21] Appl. No.: 631,855

[22] Filed: Apr. 10, 1996

Related U.S. Application Data

[63] Continuation-in-part of Ser. No. 204,287, filed as PCT/GB92/01179 Jun 30, 1992, abandoned.

[30] Foreign Application Priority Data

Sep. 17, 1991 [GB] United Kingdom .................. 9119852

[51] Int. Cl.$^6$ .................. F02C 7/32; F02K 3/04
[52] U.S. Cl. .................. 60/226.1; 60/39.161
[58] Field of Search .................. 60/39.142, 39.161, 60/39.33, 226.1, 39.091

[56] References Cited

U.S. PATENT DOCUMENTS

| | | | |
|---|---|---|---|
| 3,348,379 | 10/1967 | Wilde | 60/226.1 |
| 3,792,586 | 2/1974 | Kasmarik | 60/226.1 |
| 4,068,470 | 1/1978 | Sargisson et al. | 60/226.1 |

FOREIGN PATENT DOCUMENTS

| | | |
|---|---|---|
| 2015354 | 4/1970 | France . |
| 2152362 | 4/1973 | France . |
| 2169968 | 7/1986 | United Kingdom . |

*Primary Examiner*—Louis J. Casaregola
*Attorney, Agent, or Firm*—Cushman Darby & Cushman IP Group of Pillsbury Madison & Sutro LLP

[57] ABSTRACT

A ducted fan gas turbine engine includes a fan which is driven by a low pressure turbine via a load transmitting shaft. The load transmitting shaft additionally drives the accessories of the engine and the aircraft upon which it is mounted. In the event of an engine failure, the power produced by the windmilling of the engine fan is sufficient to provide continuity of drive to the accessories.

3 Claims, 1 Drawing Sheet

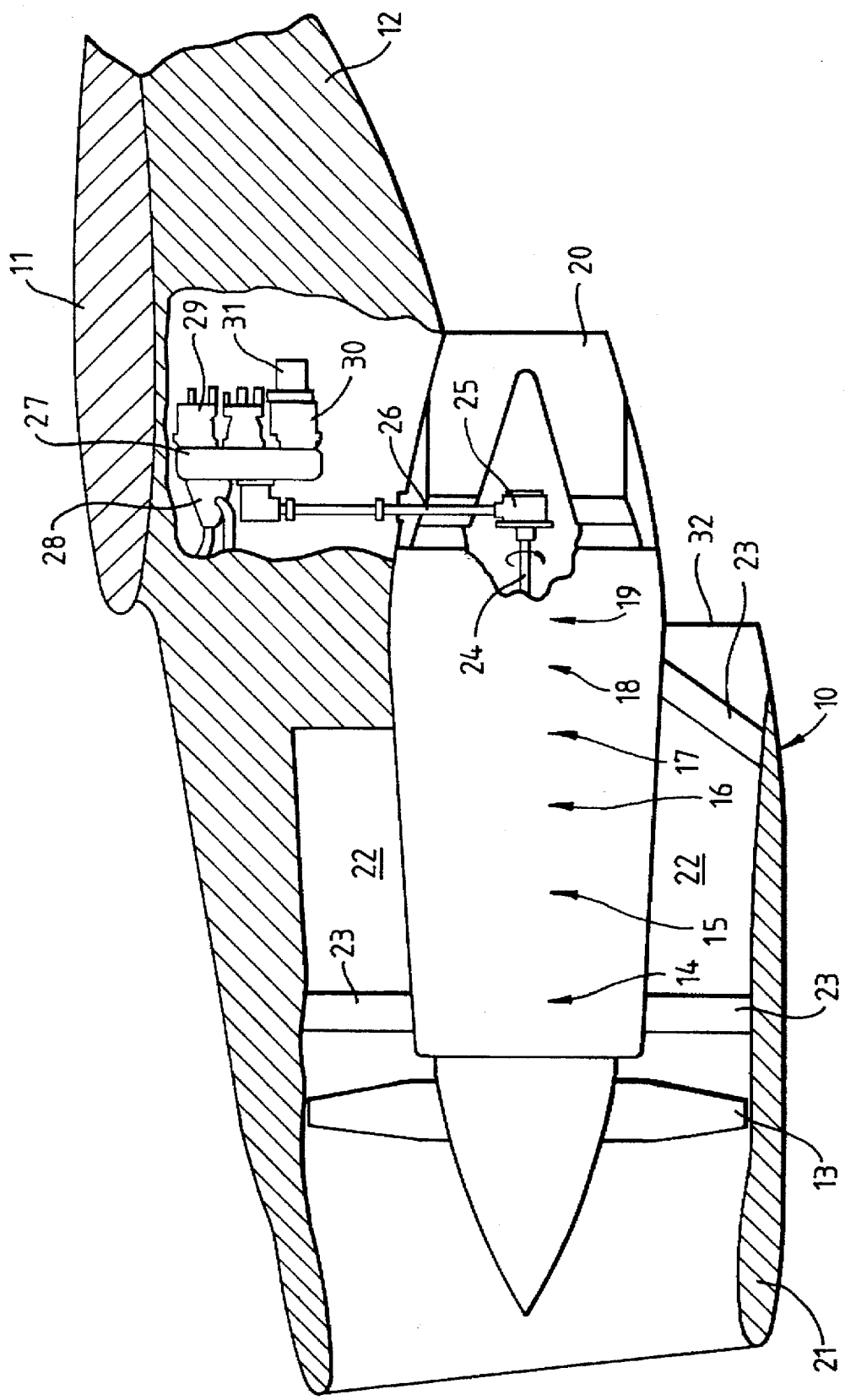

DUCTED FAN GAS TURBINE ENGINE ACCESSORY DRIVE

This is a continuation-in-part (CIP) of application Ser. No. 08/204,287, filed as PCT/GB92/01179 May 30, 1992, which was abandoned upon the filing hereof.

FIELD OF THE INVENTION

This invention relates to a ducted fan gas turbine engine accessory drive system for driving the accessories on the engine and the aircraft upon which the engine is operationally mounted.

In addition to providing propulsive thrust for an aircraft, the gas turbine engines mounted on that aircraft are required to provide electrical and hydraulic power for accessories. Such power is necessary both for the engine's own accessories and those of the aircraft as a whole.

BACKGROUND OF THE INVENTION

The conventional way of extracting electrical and hydraulic power from a ducted fan gas turbine engine is to provide a direct mechanical drive from the high pressure compressor shaft of the engine to a suitable reduction gearbox. The gearbox is usually mounted on either the fan casing of the engine or on the engine core. In both arrangements an electrical generator, hydraulic pump and fuel pump are conventionally situated adjacent the gearbox so as to be driven thereby.

In the event of a failure of the gas turbine engine, continued functioning of the electrical generator and hydraulic pump is ensured by the bringing into operation of a ram air turbine mounted elsewhere on the aircraft. The ram air turbine operates only in the event of an engine failure. Therefore during normal aircraft operation the ram air turbine is not in use and therefore constitutes an undesirable weight penalty.

SUMMARY OF THE INVENTION

It is an object of the present invention to provide an accessory drive system which obviates the need for such a ram air turbine in the event of an engine failure.

According to the present invention, a ducted fan gas turbine engine for mounting on an aircraft comprises a fan and a low pressure turbine, said low pressure turbine being adapted to drive said fan via a load transmitting shaft which interconnects them, said load transmitting shaft being additionally adapted to drive the accessories of said ducted fan gas turbine engine and of any aircraft upon which said engine is mounted an additional drive shaft drivingly interconnecting the downstream end of said load transmitting shaft and said accessories.

BRIEF DESCRIPTION OF THE DRAWINGS

The present invention will now be described, by way of example, with reference to the accompanying drawing which is a partially sectioned side view of a ducted fan gas turbine engine in accordance with the present invention.

DETAILED DESCRIPTION OF THE INVENTION

Referring to the drawing, a ducted fan gas turbine engine 10 is suspended from the wing 11 of an aircraft by means of a pylon 12 in the conventional manner.

The ducted fan gas turbine engine 10 is likewise of generally conventional construction. It comprises a propulsive fan 13, an intermediate pressure compressor 14, a high pressure compressor 15, combustion equipment 16, high, intermediate and low pressure turbines 17,18 and 19 respectively and a propulsive nozzle 20. The fan 13 together with a majority of the remainder of the engine 10 are enclosed by a fan casing 21. The fan casing 21 cooperates with the remainder of the engine 10 to define a substantially annular fan duct 22 which extends the length of the fan casing 21. Radial struts 23 interconnect the fan casing 21 with the remainder of the engine 10.

The ducted fan gas turbine engine 10 operates in the conventional manner. Air entering the engine 10 at the open upstream end of the fan casing 21 is compressed by the rotation of the fan 13. The majority of the air compressed by the fan 13 flows through the fan duct 22 before finally being exhausted through the downstream end 32 of the fan duct 22 to provide propulsive thrust.

The remainder of the air compressed by the rotation of the fan 13 is directed into the intermediate pressure compressor 14. There the air is compressed further before it is directed into the high pressure compressor 15 where still further compression takes place. The air is then directed into the combustion equipment 16 where it is mixed with fuel and the mixture combusted. The resultant combustion products then expand through, and thereby drive, the high, intermediate and low pressure turbines 17,18 and 19 respectively before exhausting through the nozzle 20 to provide additional propulsive thrust.

The high and intermediate pressure turbines 17 and 18 respectively drive the high and intermediate pressure compressors 15 and 14 by means of coaxial shaft (not shown) which extend along the longitudinal axis of the engine 10. A further shaft 24 which is coaxial with the other shafts and which can be seen in the drawing partly in broken lines, interconnects the low pressure turbine 19 and the fan 13. It will be seen that the shaft 24 between the fan 13 and the low pressure turbine 19 provides a direct, uninterrupted transmission of torque from the fan to the low pressure turbine 19 and from the low pressure turbine through the extension 24' to the first gear box 25. Thus the shaft 24 transmits drive between the low pressure turbine 19 and the fan 13 and to the accessories through gear box 27 and 25 so that, in the event of engine failure, rotation of the fan due to the passage of air through the fan casing 21 will be able to generate approximately 50 to 60 horsepower which is sufficient to drive the accessories 28–31 at an acceptable speed. This is achievable by the direct connection of the shaft 24 between the fan 13 and the low pressure turbine 19, that is, without the impedance caused by an intermediately located gear box or other transmission device.

The downstream end of the shaft 24 is drivingly connected to a first gearbox 25. The first gearbox 25 has an output shaft 26 which extends perpendicularly to the low pressure turbine shaft 24 into the interior of the pylon 12 where it provides the power input to a second gearbox 27.

The second gearbox 27 has attached to it, and drives, several engine and aircraft accessories. Specifically these are the main engine fuel pump 28, a hydraulic pump 29 for powering aircraft and engine hydraulic systems, a first generator 30 for providing aircraft electrical power and a second generator 31 for providing engine electrical power.

Under normal operating conditions of the ducted fan gas turbine engine 10, the low pressure turbine shaft 24 drives the various engine and aircraft accessories 28–31 in the manner described above. However since the accessories 28–31 are mounted within the pylon 12 they are located further away from the engine 10 than is normally the case. As a consequence, they are not subject to same levels of heat and vibration as conventionally mounted accessories. This in turn leads to longer life and greater reliability of the accessories.

In the event of an in-flight failure of the gas turbine engine 10, the fan 13 is allowed to windmill; that is to be rotated by the flow of ambient air over it. This in turn results in the rotation of the low pressure turbine shaft 24, consequently providing continuity of drive to the first and second gearboxes 25 and 27 and hence the accessories 28–31.

The fan 13, when windmilling, generates approximately 50 to 60 horsepower. This compares with the generation of approximately 2 to 3 horsepower by the high pressure compressor 15 as a result of its windmilling. Consequently whereas the power generated by the windmilling fan 13 is sufficient to drive the accessories 28–31 at an acceptable speed, the power generated by the high pressure compressor 15 is not.

As explained earlier, in the event of failure of a conventional ducted fan gas turbine engine in which the accessories are driven from the engine's high pressure compressor shaft, it is necessary to provide a separate ram air turbine in order to achieve the necessary accessory drive power. The high power output of the windmilling fan 13 ensures that such a separate ram air turbine is not necessary. Consequently there is a resultant weight and cost saving as a result of the use of the system of the present invention.

It will be seen therefore that in the event of an in-flight failure of the ducted fan gas turbine engine 10, windmilling of the fan 13 ensures that there is still sufficient power available to drive the accessories 28–31. Thus there is provided continuity of electrical and hydraulic power to the aircraft on which the engine 10 is mounted. Additionally power is available for the various accessories of the engine 10 if it is desired to attempt to re-start the engine 10.

I claim:

1. A ducted fan gas turbine engine for mounting on an aircraft comprising a fan and a low pressure turbine, said low pressure turbine driving said fan through a load transmitting shaft which interconnects said low pressure turbine and said fan directly, said load transmitting shaft being connected through an intermediate shaft to accessories of said gas turbine engine wherein said intermediate shaft directly interconnects said load transmitting shaft and said accessories, said load transmitting shaft being free of any connection to any high pressure turbine and any gear element at least between said fan and said low pressure turbine.

2. A ducted fan gas turbine engine (10) as claimed in claim 1 characterised in that said engine (10) is operationally suspended from an aircraft by means of a pylon (12), said accessories (28,29,30,31) being mounted within said pylon (12).

3. A ducted fan gas turbine engine (10) as claimed in claim 1 characterised in that said accessories (28,29,30,31) include those which provide electrical and hydraulic power to said engine (10) and any aircraft upon which said engine (10) is mounted.

* * * * *